United States Patent [19]

Bavaro et al.

[11] Patent Number: 5,734,229
[45] Date of Patent: Mar. 31, 1998

[54] BACK-UP ELECTRICAL SYSTEM FOR PORTABLE TABLE LAMPS

[76] Inventors: Joseph P. Bavaro, 16 Pheasant La., Topsfield, Mass. 01983; Joseph S. Russo, 5 Joseph Ave., Peabody, Mass. 01960

[21] Appl. No.: 563,918

[22] Filed: Nov. 29, 1995

[51] Int. Cl.$^6$ ................................................ H05B 37/00
[52] U.S. Cl. .................. 315/86; 315/154; 315/209 R; 362/20
[58] Field of Search ........................ 315/86, 87, 57, 315/154, 209 R, 219, 225, 175; 362/20

[56] References Cited

U.S. PATENT DOCUMENTS

| | | | |
|---|---|---|---|
| 4,682,078 | 7/1987 | Pascalide | 315/86 |
| 4,727,291 | 2/1988 | Bavaro | 315/86 |
| 4,751,398 | 6/1988 | Ertz, III | 315/86 X |
| 4,977,351 | 12/1990 | Bavaro et al. | 315/87 |
| 5,004,953 | 4/1991 | McDonald | 315/86 |
| 5,202,608 | 4/1993 | Johnson | 315/86 |
| 5,365,145 | 11/1994 | Fields | 315/86 |
| 5,426,347 | 6/1995 | Nilssen | 315/209 R |

*Primary Examiner*—Robert Pascal
*Assistant Examiner*—Haissa Philogene
*Attorney, Agent, or Firm*—George E. Kersey, Esq.

[57] ABSTRACT

A back-up power system for a portable table lamp which accommodates a standard replaceable compact fluorescent bulb that is illuminated from an AC main power source when AC house current is available and is illuminated by a DC to DC converter when AC house current is unavailable, the converter being powered by replaceable low voltage battery located in the base of the lamp and charged by the AC source, with the loss of AC house current being sensed to cause the disconnection of the AC house current source and connection to the low voltage replaceable battery.

18 Claims, 4 Drawing Sheets

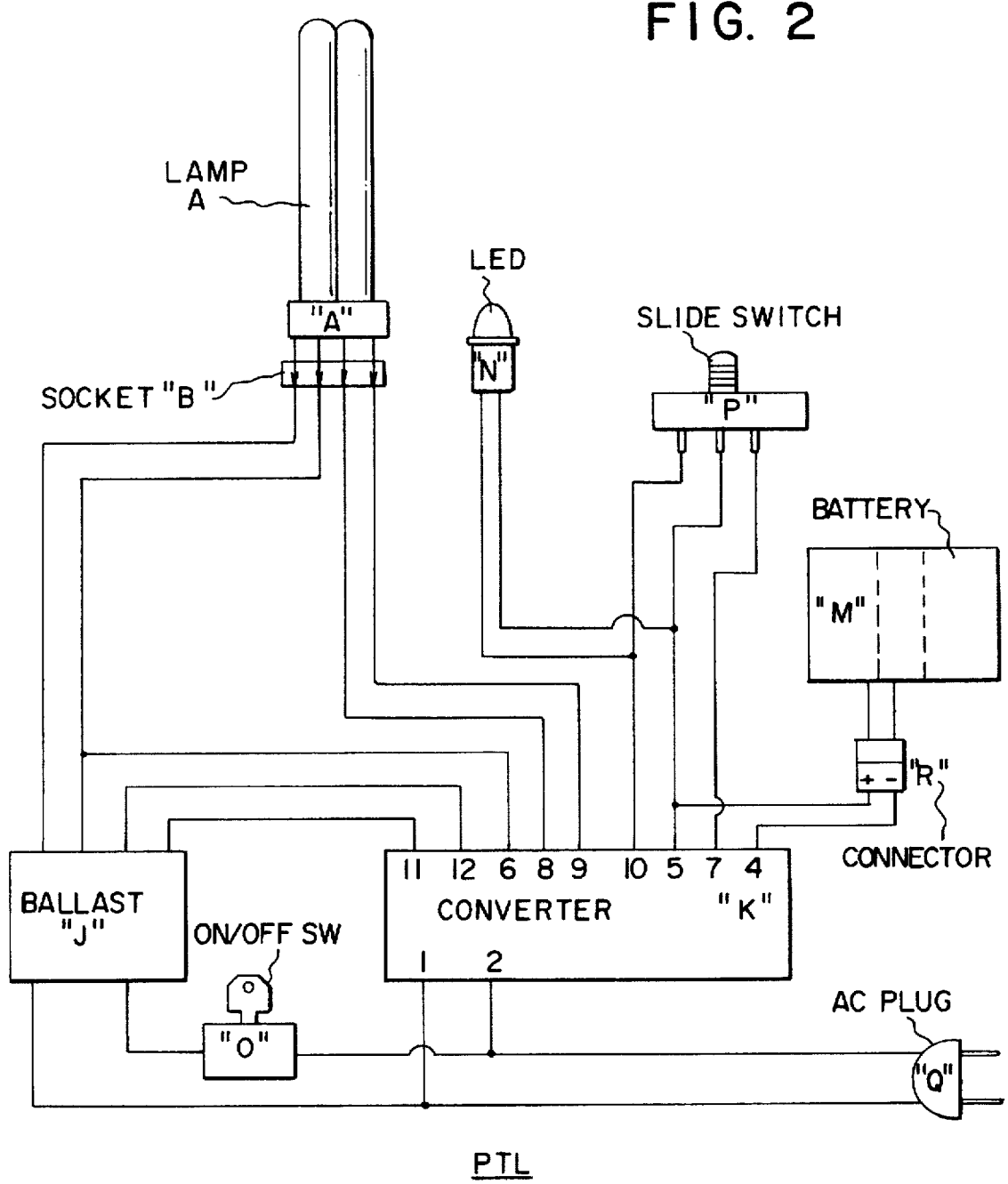

BACK-UP ELECTRICAL SYSTEM FOR PORTABLE TABLE LAMPS

RIGHTS UNDER FEDERALLY SPONSORED RESEARCH

The present invention has not resulted from Federally sponsored research.

CROSS REFERENCES TO RELATED APPLICATIONS

There are no known related applications

Background of the Invention

1. Field of Invention

This invention relates to lighting devices, and more particularly, to decorative portable table lamps.

Over the past 10 years natural disasters have been at an all time high, i.e., hurricanes, tornadoes, earthquakes, floods, ice storms, lightning storms, blizzards, and utility company power failures. Consequently, there is a need for a portable table lamp that can function in the face of power failures for home and commercial use.

2. Description of the Prior Art

Attempts have been made in the prior art to provide back-up lighting in the event AC main power fails. However, all of the prior art inventions must be hard-wired and installed either by a qualified licensed electrician or a person skilled in the installation of electrical lighting and equipment.

All of the prior art responds and goes into a DC back-up mode when AC (alternating current) mains are not available. However, none can be switched "on" and "off" in the DC (direct current) back-up mode when AC mains are not available.

All of the prior art generally fails to protect the back-up DC battery from excessive heat. None of the prior art completely isolates the battery from heat generated components.

The prior art cannot be portable and used in different areas in the event AC main power is not available. Further, none of the prior art can be suitable for just about any decor.

Accordingly, there is a need for a back-up portable table lamp that overcomes the prior art shortcomings.

It is the object of the invention to completely eliminate the installation cost associated with emergency back-up lighting, and make available to the home owner reliable standard and back-up lighting in a portable table lamp that is both aesthetically pleasing and operational to suit the home or any other area that requires or wants the safety and convenience of standard back-up lighting in a portable table lamp.

SUMMARY OF THE INVENTION

Broadly, the present invention provides a backup power system for a fluorescent bulb which is inserted into a socket and lighted through a polarized line cord during normal operating conditions when AC line power is present. The lamp operating on AC current is powered through a fluorescent ballast, mounted on a bracket located inside a glass or plastic envelope, or vase.

The bulb can be turned "on" and "off" when AC main power is available by a switch located on the base of the portable table lamp. When AC power is not present, the lamp remains lighted by an internal low voltage replaceable battery located at the base of the portable table lamp. The battery is connected to a DC to DC converter mounted on the ballast bracket located inside the glass or plastic envelope, or vase.

The battery inside the base of the table lamp is replaceable by an easily removable nut, holding the base cover and connected to a threaded nipple, thereby allowing removal of the base cover and the battery to facilitate replacing the battery. The connector allows the battery to be removed and replaced from inside the table lamp base. The battery is connected to a slide switch located on the lamp base to allow the battery to be disconnected from the circuit to disable the DC to DC converter and allow the user back-up capacity when needed, thereby increasing backup capacity or preventing the automatic transfer of back-up capacity from taking place.

An LED (light emitting diode) indicator is not lighted when the slide switch is in position to disable the battery, thereby preventing operation of the DC to DC converter, and the other component parts necessary to provide back-up lighting. However normal operation when AC main power is available can still take place. A harp saddle of the lamp is connected to an upper nipple, which is held by a nipple nut. The saddle holds the harp, and the harp holds a lamp shade.

When the LED indicator mounted on the lamp base is lighted, the slide switch is in position to energize the battery when the AC main power is present, thereby causing the circuit, in the event of the AC main power loss, to transfer power to the DC to DC converter and drive the lamp in the back-up mode. The LED is not lighted when the AC main power is not present.

BRIEF DESCRIPTION OF THE DRAWINGS

The invention will become more apparent from the following detailed specifications and drawings in which:

FIG. 2 is a wiring diagram showing point-by-point wiring and internal parts embodying the invention;

DETAILED DESCRIPTION OF THE PREFERRED EMBODIMENTS

Figure 1:
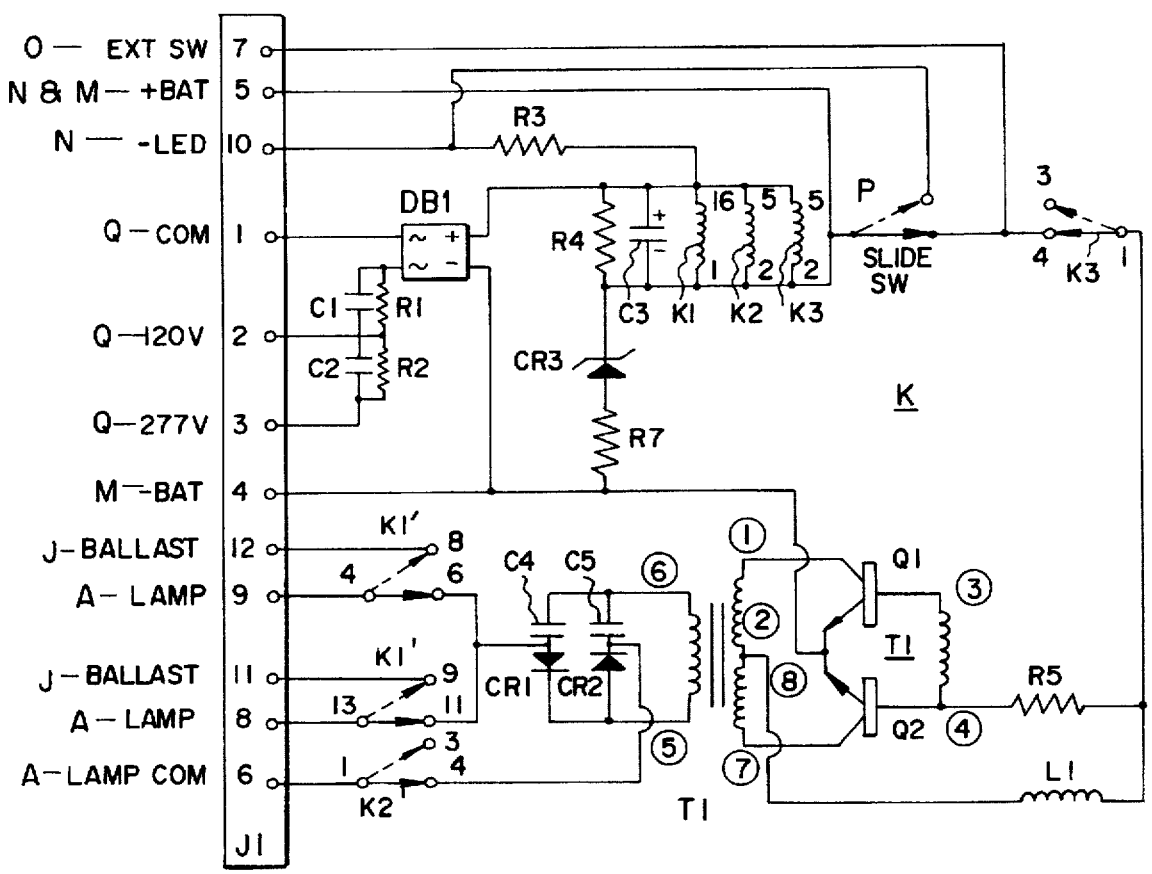
FIG. 1 is a schematic diagram of the back-up electrical system embodying the invention for portable table lamps with an AC power supply and a DC power source.
Figure 1B:
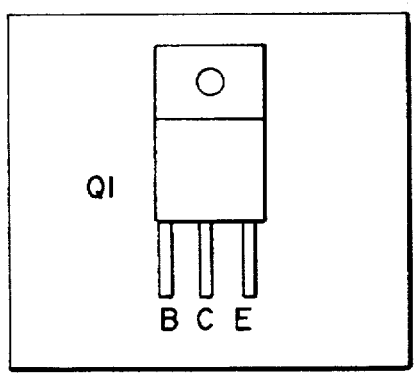
FIG. 1B is a bottom view of a transistor included in FIG. 1.
Figure 1A:
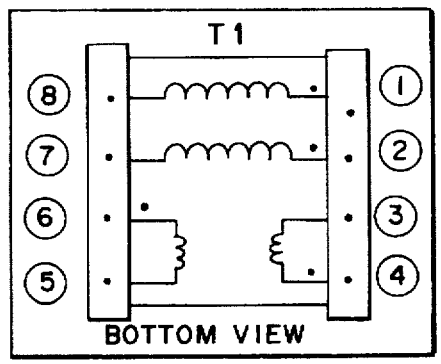
FIG. 1A is a bottom view of a transformer included in FIG. 1.

Referring in more detail to the schematic diagram of FIG. 1 and the wiring diagram of FIG. 2, the portable table lamp PTL is a two-in-one lamp that incorporates standard replaceable compact energy saving fluorescent bulbs A. When the AC main power is not available the portable table lamp PTL becomes a back-up portable table lamp, lighting the same bulb A in the back-up mode that was lighted when the AC main power was present. When the AC main power is present, power is supplied through a fluorescent electronic ballast or standard magnetic ballast J. The absence of AC main power is sensed through relays and is automatically transferred to battery back-up M. This is accomplished by an electronic converter K, described below.

DC to DC Converter Function

The circuit of the converter K has three functions; first, it supplies a trickle current to keep the battery M charged; second, it acts as a detector that senses the absence of AC main power which initiates the switch over to battery back-up; third, it converts the low voltage DC to a high voltage to energize the fluorescent bulb A.

Charging Circuit

Figure 3:
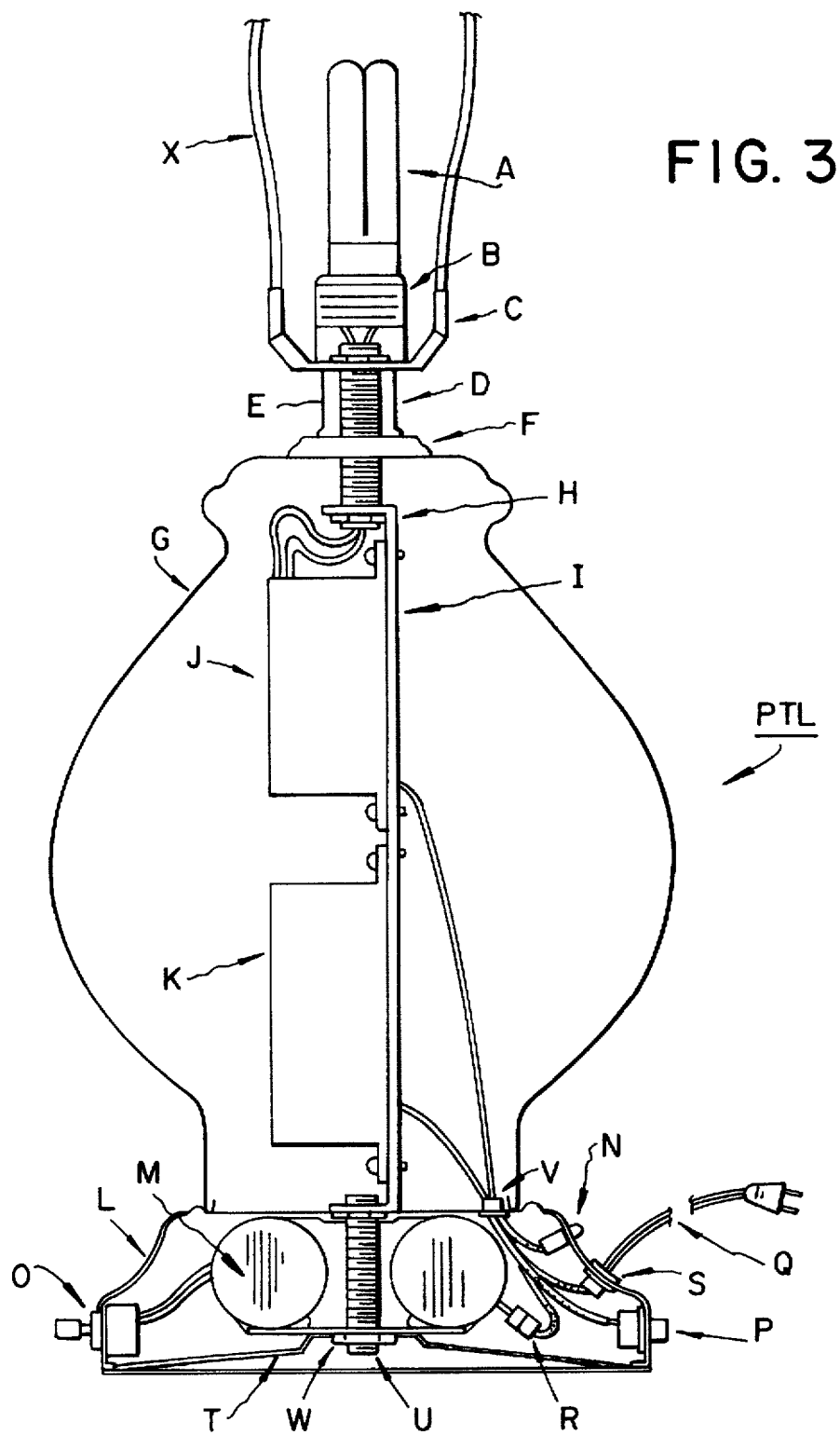
FIG. 3 is a plan view of the components and their respective locations which embody the invention.

AC main power is applied to a full wave bridge rectifier labeled DB1 in FIG. 1 and internally wired inside converter K in FIG. 2 and FIG. 3, through a series current limiting capacitor labeled C1 for 120 volts and C2 for 277 volts in FIG. 1, and internally wired in converter K of FIG. 2 and FIG. 3 to produce the DC current to operate the three parallel sensing relays labeled K1, K2 and K3 located in FIG. 1, with contacts K1', K2' and K3' internally wired within DC to DC converter K of FIG. 2 and FIG. 3. The parallel relays K1, K2 and K3 are in series with the battery M and produce a trickle charge current. An LED N is connected at terminals 5 & 10 of connector J1 in FIG. 1 in parallel with the relays K1, K2 and K3, which light the LED N to give a visual indication that the back-up power supply M is in the "on" position and the slide P switch is in a position that will allow the DC power supply to automatically transfer if the AC main power is lost.

Sensing Circuit

With the absence of the AC main power the sensing relays K1, K2 and K3 become de-energized causing the lamp A that was in the AC mode supplied by a fluorescent magnetic or electronic ballast J to be switched to the circuit of the DC converter K. This is accomplished through the contacts K1' and K2' of the relays K1 and K2 in FIG. 1, and internally connected in the converter K of FIGS. 2 and 3.

Converter Circuit

With the de-energizing of the K3 sensing relay of FIG. 1, the contacts K3' lose enabling a current to flow through resistor R5 and choke L1 in FIG. 1 of a push-pull multi-vibrator and are internally connected in converter K of FIG. 2 and FIG. 3.

Transistors Q1, Q2 and transformer T1 of FIG. 1 are internally located and wired in converter K of FIG. 2, and FIG. 3. The low voltage of battery M is transformed into 500 VAC at a high frequency (25 KHZ). The capacitors C4 and C5, in conjunction with the diodes CR1 and CR2, form a DC voltage doubler and produce the necessary DC high voltage and low current to ionize the gas in the fluorescent bulb A of FIG. 1, and are internally connected and located in converter K of FIG. 2 and FIG. 3.

DC to DC Converter

The DC to DC converter labeled K in FIG. 2 and FIG. 3 is a modular part which contains all the electronic component parts, relays and the like, to facilitate the operation of the portable table lamp A in both the presence of AC main power and the absence of AC main power. Further, the modular part labeled K in FIG. 3 contains the charging circuit, sensing circuit, and converter, all in one modular part.

The portable table lamp PTL looks just like any decorative lamp, except when the AC main power is lost, the portable table lamp automatically comes on. The fact that the portable table lamp PTL can be plugged into standard house current and is aesthetically decorative, makes it useful in any room for both normal and backup uses. It can also be switched "on" and "off" both when AC main power is available and when AC main power is not available.

With reference to FIG. 3, the portable table lamp PTL also incorporates long life replaceable compact fluorescent bulbs A and energizes the standard replaceable compact fluorescent bulb A that is inserted inside the socket B of the table lamp. The portable table lamp PTL requires no assembly. Just plug in the standard polarized cord Q in any standard outlet or receptacle and it is ready to work. As long as the AC main power is available and the lamp is plugged into an electrical outlet, the portable lamp PTL will always trickle charge the replaceable low voltage battery M located at the base L of the portable table lamp.

The circuit of the lamp PTL operates with a standard portable fluorescent bulb A. When AC main current is available, the standard bulbs A used with the portable table lamp are operational so the portable table lamp light output produces a maximum brightness. When AC main current is available, an on-off turn switch O, located on the side of the base L of the portable table lamp, allows users to switch the light "on" and "off" as they please. When the main current is not available, the battery M maintains the same bulb A that was energized when AC main current was available.

The back-up power can be interrupted by a separate slide switch P located on the opposite side of the turn switch O. This slide switch P is mounted on the side of the base L of the portable table lamp. An LED N is also mounted next to the slide switch P. The slide switch P allows the user to extend the back-up capacity of the battery M only when the user wants to turn on the light in the back-up mode when AC main power is not available, thus allowing extended use of the back-up capacity. The slide switch P also gives the user the option to prevent automatic operation in the back-up mode in the event the AC main power is lost during the day time or when the user is sleeping. The LED N is mounted next to the slide switch P. When the LED N is lighted, it indicates that the portable table lamp PTL is in the stand-by mode. If the slide switch P is moved to the opposite position, this will prevent the portable table lamp from automatically going into the back-up mode when AC main current is not available.

Further the LED N will not be lighted to indicate to the user that when the AC main current is not available that the portable table lamp PTL will not automatically go into back-up mode. In this embodiment one standard portable fluorescent bulb A is powered directly from the AC line through a fluorescent ballast J. When the AC power is not available, the relay K1 disconnects the AC ballast from the standard portable fluorescent bulb A and connects the same bulb A to the DC to DC converter K that is powered by the internal low voltage replaceable battery M located at the base L of the portable table lamp PTL. When the AC power is restored the portable table lamp will automatically recharge the battery M, and the standard portable fluorescent lamp A will remain in the same mode it was in before the loss of the AC main power.

Figure 4:
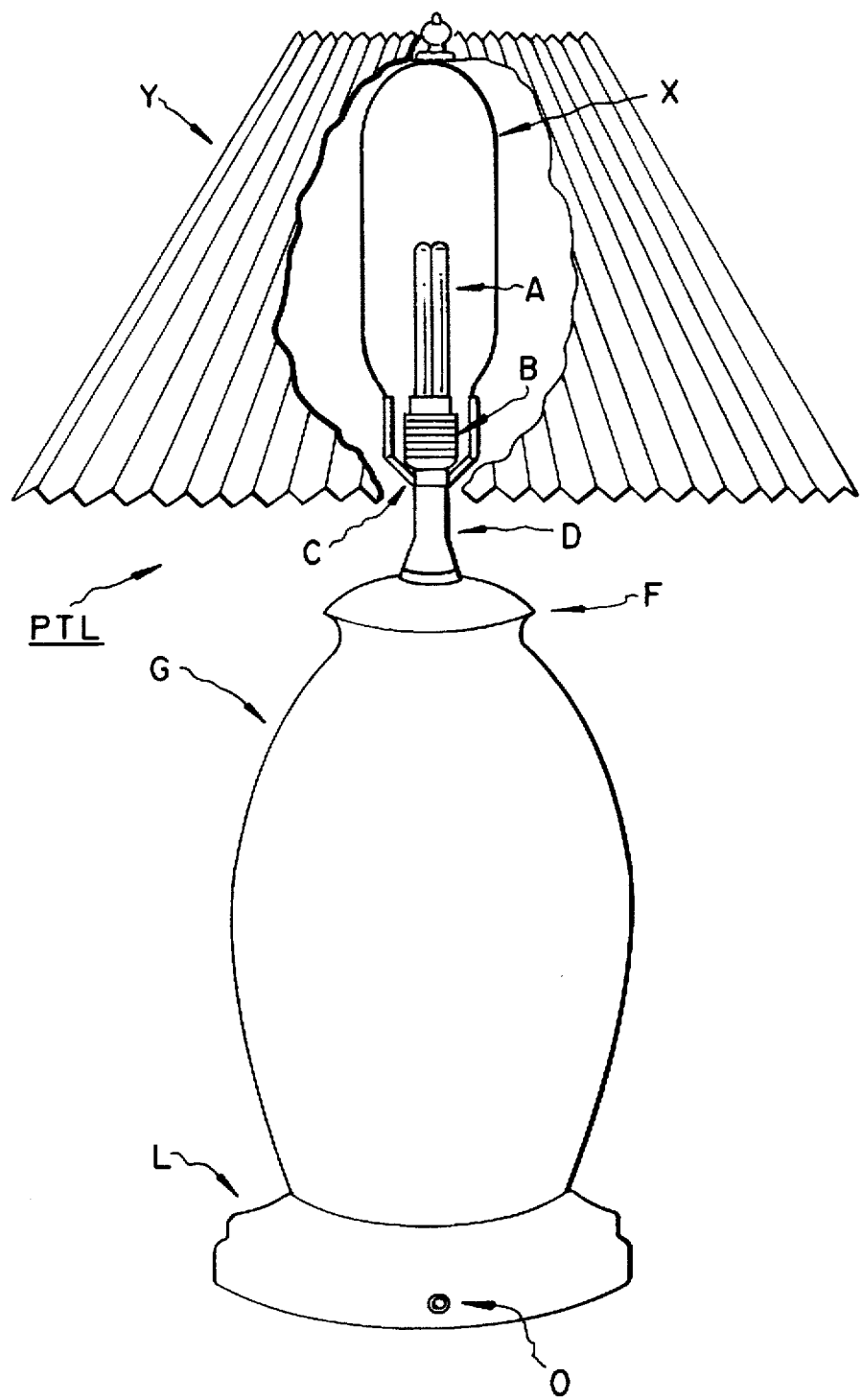
FIG. 4 is a drawing of a typical portable table lamp where all the components that embody the invention are concealed inside a glass or plastic envelope, or vase, and the base of the fixture has access to a replaceable battery.

All the components, such as the ballast J to drive the lamp A when the AC main power is available, the DC to DC converter K to drive the lamp A when AC power is not available, the battery charger DB1, the replaceable low voltage battery M, and all other components that operate the lamp A, both when AC main power is available and when AC power is not present, are located inside the decorative envelope G and the lamp base L as shown in FIGS. 3 and 4 of the drawings.

The back-up power system for the portable table lamp PTL is powered by a standard polarized line cord Q from AC house current. The polarized line cord Q is affixed to the portable table lamp PTL by a strain insulator S. The portable lamp PTL operates the standard replaceable compact fluorescent bulb A when the AC main power is available. When the AC main power is available, the standard replaceable compact fluorescent bulb A can be lighted or turned off by the turn switch O located at the base L of the portable lamp. The replaceable low voltage battery M located in the base L of the portable lamp is equipped with the battery charging circuit DB1 powered from the AC main and connected to the battery M for generating a current for charging the battery M.

When the AC main power is not present due to a power failure or circuit breaker, fuse trip, the same standard replaceable compact fluorescent bulb A that was lighted when the AC main power was available is automatically lighted regardless of what position the turn switch O was in prior to the loss of the AC main power. When the circuit senses the loss of AC main power, relays K1 and K2 disconnect the AC portion of the circuit and connect the DC to DC converter K, which is powered and connected to the low voltage replaceable battery M located in the base L of the portable table lamp PTL. When the AC main power is restored, the circuit senses the presence of the AC main power, relays K1 and K2 disconnect the DC to DC converter K and reconnect the AC main power, thus restoring the bulb A in the portable table lamp PTL to where it was prior to the loss of the AC main power.

Included is the AC line magnetic or electronic ballast J for powering the standard replaceable compact fluorescent bulb A which is inserted in the socket B of the portable table lamp PTL. The AC line magnetic or electronic ballast J operates the standard replaceable compact fluorescent bulb A when the AC main current is available. The AC line magnetic or electronic ballast J located inside the glass or plastic envelope or vase G is concealed. However, the AC line magnetic or electronic ballast J remains accessible for repair or replacement by standard removable parts which are an integral part of the hardware necessary to mechanically hold the portable table lamp together.

Further, inserting the AC line magnetic or electronic ballast J inside the glass or plastic envelope or vase G facilitates the means to operate such a portable table lamp in both the presence of AC main power and the loss of AC main power.

Further, inserting the AC line magnetic or electronic ballast J into the glass or plastic envelope or vase G hides the AC line magnetic or electronic ballast J from sight allowing the portable table lamp PTL to have a decorative appearance suitable for areas that require or have a decorative setting.

The DC to DC converter K located inside the glass or plastic envelope or vase G also is concealed. However, the DC to DC converter K remains accessible for repair or replacement by standard removable parts which are an integral part of the hardware necessary to mechanically hold the portable table lamp PTL together. Inserting the DC to DC converter K inside the glass or plastic envelope or vase G facilitates the means to operate such a portable table lamp in both the presence of AC main power and the loss of AC main power. Further, inserting the DC to DC converter K into the glass or plastic envelope or vase G hides the DC to DC converter K from sight allowing the portable lamp PTL to have a decorative appearance suitable for areas that require or have a decorative setting.

The AC line magnetic or electronic ballast J operates the standard replaceable compact fluorescent bulb A when the AC main current is present, and the DC to DC converter K operates the same standard replaceable compact fluorescent bulb A when the AC main current is not present. They are concealed and inserted inside the glass or plastic envelope or vase thereby allowing the AC line magnetic or electronic ballast J and the DC to DC converter K to be accessible for repair or replacement by standard removable parts which are an integral part of the hardware necessary to mechanically hold portable table lamp PTL together.

Inserting the AC line magnetic or electronic ballast J and the DC to DC converter K inside the glass or plastic envelope or vase G facilitates the operation of the portable table lamp PTL in both the presence of AC main power and the loss of AC main power. Further, inserting the AC line magnetic or electronic ballast J inside the glass or plastic envelope or vase G hides the AC line magnetic ballast J and the DC to DC converter K from sight, allowing the portable table lamp PTL to have a decorative appearance suitable for areas that require or have a decorative setting.

The low voltage replaceable battery M is installed in such a manner that it can easily be removed and replaced by removing a bottom nipple nut W to remove a base cover T and give access to the battery M. Removal of an additional nut attached to the base nipple U and attached to the battery M will free the battery from the hollow compartment in the base L of the portable table lamp PTL. Further a battery connector R attached to the battery leads allows the battery M to be removed for replacement. The low voltage replaceable batteries M are nicad D cells and are designed in such a way as to fit into the hollow base L compartment of the portable table lamp PTL.

The base L of the portable table lamp PTL is designed such as to fit a 2-nicad D cell pack M in a fashion to facilitate ease of removal of the nicad battery pack. Such a design of the base L allows operation of the portable lamp PTL in both the presence of AC main power and the loss of AC main power. Further, the base design hides the 2-nicad D cell pack M from sight, allowing the portable lamp PTL to have a decorative appearance suitable for areas that require or have a decorative setting.

The base cover T of the portable table lamp PTL is designed such that it can be attached to the base L by the base nipple U by the base nipple nut W in such a manner, with the base cover T indented, that it will not prevent the portable table lamp PTL from sitting flat on a surface, and allow access into the hollow space of the base L of the portable table lamp for replacement of the two D cell nicad batteries M.

The turn switch O is mounted on the base L of the portable table lamp PTL such that the turn switch O can light the bulb A in the portable table lamp and can also turn the bulb in the portable table lamp to not be lighted when AC main power is present. Further, the turn switch O is wired such that it will not prevent the bulb A in the portable table lamp from automatically lighting the same bulb A that was lighted when the AC main power is not present.

The LED N mounted on the base L of the portable table lamp PTL is lighted when AC main power is present and indicates that the circuit in the portable table lamp is such that when AC main power is present the table lamp shall in the event of the loss of the AC main power automatically light the bulb A in the backup mode when the AC main power is not available.

When the LED N mounted on the base L of the portable table lamp is not lighted, it indicates that the AC main power is not present, or that the AC main power is present and operating in the AC mode. However, the portable lamp is not automatically transferred to the back-up mode in the event AC main power is not present.

The slide switch P is mounted on the base L of the portable table lamp, and, when the slide switch P is positioned in one of its two positions, it lights the LED N and connects circuitry located inside the portable table lamp in such a manner as to allow the portable table lamp to automatically go into a back-up mode when AC main power is not available.

With the slide switch P mounted on the base L of the portable table lamp, when the slide switch P is positioned in one of its two positions, and the LED N is not lighted, circuitry located inside the portable table lamp PTL does not respond in the back-up mode when AC main power is not present. Further the battery M is disconnected from the circuit to prevent the portable table lamp circuitry from going into the back-up mode when AC main power is not present.

The slide switch P is used to switch the power to the bulb A in the portable table lamp in the "on" or the "off" position when AC main power is not present, allowing the user the option to use the portable lamp in the back-up mode only when it is needed, or preventing the automatic transfer to the back-up mode if no one is home and transfer to the back-up mode would cause a waste of back-up capacity of the battery M or full discharge of the battery.

Placement of the battery M into the hollow compartment of the base L of the portable table lamp prevents the battery M from being exposed to excessive heat that is generated by the parts located inside the glass or plastic envelope or vase G.

A bracket I located inside the glass or plastic envelope or vase G makes it possible to mount the DC to DC converter K and the AC line magnetic or electronic ballast J along with the electronic components, circuitry splices by mechanical attachment of the bracket I to the base L of the portable table lamp, and to the bulb socket B of the portable table lamp, with the upper nipple E and lower nipple U and the nipple nuts H and W securing the hardware to facilitate the operation of the portable table lamp PTL for both the presence of AC main power and the loss of AC main power.

Further, aligning the parts as shown in FIG. 3, and following the schematic diagram in FIG. 1, and tne wiring diagram in FIG. 2, hides the parts in FIG. 3 from sight allowing the portable table lamp to have the decorative appearance of FIG. 4, suitable for areas that require or have a decorative setting.

A harp saddle C of the lamp PTL is connected to an upper nipple D, which is held by a nipple nut. The saddle C holds the harp X, and the harp X holds a lamp shade Y.

The portable table lamp PTL operates both when AC power is present and when AC power is not present, and has a polarized line cord Q that fits into a standard house current receptacle.

When the portable table lamp PTL is unplugged, it can be transported to other areas either lighted or not lighted, depending which position the slide switch P is in.

The invention is defined by the claims which appear below.

We claim:

1. A back-up power system for a portable table lamp having a base and powered from a circuit providing AC house current from a source of AC main power through a standard polarized line cord, comprising means, including a strain insulator, for affixing the polarized line cord to the portable table lamp;

means in said portable table lamp for accommodating a standard replaceable compact fluorescent bulb;

a turn switch located at the base of said portable table lamp for lighting or turning off said standard replaceable compact fluorescent bulb when AC house current is available;

a replaceable low voltage battery located in said base of said portable table lamp and equipped with a battery charging circuit powered by the AC source and connected to said battery for generating a current to charge said battery;

means for sensing any loss of said AC main power current, disconnecting the circuit of said AC house current and connecting a DC to DC converter which is powered and connected to said low voltage replaceable battery located in said base of said portable table lamp;

said standard replaceable compact fluorescent bulb being automatically lighted regardless of the position of said turn switch when said AC house current is not present due to a power interruption; and means for sensing the restoration of AC main power, disconnecting said DC to DC converter and reconnecting said AC main power;

thereby restoring said standard replaceable compact fluorescent bulb in said portable table lamp to where it was prior to the loss of said AC main power.

2. A back-up power system according to claim 1 further including an AC line ballast for powering said standard replaceable compact fluorescent bulb inserted in a socket of said portable table lamp;

said AC line ballast operating said standard replaceable compact fluorescent bulb when the AC main current is available and being located and concealed inside an envelope vase while remaining accessible for repair and replacement by parts that include standard removable parts that mechanically hold said portable table lamp together;

said AC line ballast being inserted inside said envelope to facilitate the operation of said portable table lamp for the presence of AC main power;

the concealment of said ballast from sight allowing said portable table lamp to have a decorative appearance suitable for areas that desire a decorative setting.

3. A backup power system according to claim 1 wherein said DC to DC converter is located and concealed inside said envelope vase but remains accessible for repair and replacement by parts including standard removable parts that mechanically hold the portable table lamp together;

said DC to DC converter being inserted inside said envelope to facilitate operation of said portable table lamp in the absence of AC main power;

whereby the concealment of said DC to DC converter from sight allows said portable lamp to have a decorative appearance suitable for areas that desire a decorative setting.

4. A back-up power system according to claim 1, wherein said AC line ballast which operates said standard replaceable compact fluorescent bulb when the AC main current is present and said DC to DC converter that operates said standard replaceable compact fluorescent bulb when the AC main current is not present, are concealed and inserted inside an envelope thereby allowing said AC line ballast and said DC to DC converter to be accessible for servicing by parts including standard removable parts mechanically holding said portable table lamp together;

said AC line ballast and DC to DC converter being inside an envelope vase to facilitate operation of said portable table lamp in both the presence of AC main power and the loss of AC main power and hide said AC line ballast and said DC to DC converter from sight allowing the portable table lamp to have a decorative appearance suitable for areas that desire a decorative setting.

5. A backup power system according to claim 1 wherein said low voltage replaceable battery is installed to be easily removed and replaced by removing a cover of said base to give access to said battery, and leads of said battery are attached to a connector which is detachable to allow said battery to be removed for replacement.

6. A backup power system according to claim 5 wherein said low voltage replaceable battery is formed by a D cell pack that fits into a hollow compartment of said base of said portable table lamp.

7. A back-up power system according to claim 6 wherein said base of said portable table lamp receives said D cell pack in a manner that allows ease of removal and hides said D cell pack from sight allowing the portable lamp to have a decorative appearance suitable for areas that desire a decorative setting.

8. A back-up power system according to claim 7 wherein the said cover of said base is indented and attached to the said lamp by a base nipple and base nipple nut so that said cover will not prevent said portable table lamp from sitting flat on a surface, and allow access to said hollow compartment to allow replacement of the said D cell pack.

9. A back-up power system according to claim 1 wherein said turn switch is mounted on said base of said portable table lamp such that said turn switch can light or turn off said bulb when AC main power is present but not prevent said bulb from automatically lighting when said AC main power is not present.

10. A backup power system according to claim 1 wherein an LED is mounted on said base of said portable table lamp and is lighted when said AC main power is present;

the lighting of said LED indicating that when said AC main power is present, said bulb shall automatically light if said AC main power becomes not available.

11. A back-up power system according to claim 10 wherein said LED is mounted on said base of said portable table lamp and when not lighted indicates that said AC main power is not present or, if present, said portable lamp will not be automatically transferred to its back-up mode if there is an AC main power failure.

12. A back-up power system according to claim 1, wherein a two-position slide switch and an LED are mounted on said base of said portable table lamp so that when said slide switch is positioned in one of its two positions, it lights said LED and allows the portable table lamp to automatically go into a back-up mode when AC main power is not available.

13. A back-up power system according to claim 12 wherein when said slide switch is positioned in the other of its two positions and said LED is not lighted said battery is disconnected and said portable table lamp will not respond in said back-up mode when AC main power is not present.

14. A back-up power system according to claim 13 wherein said slide switch is used to switch said bulb in said portable table lamp between "on" and "off" positions allowing the option of using said portable lamp in the back-up mode only when it is needed and preventing automatic transfer to the back-up mode when not needed;

thereby to avoid a transfer to the back-up mode that would cause a waste of back-up capacity or cause unnecessary discharge of the said battery.

15. A back-up power system according to claim 6 wherein the placement of the said battery into said hollow compartment of said base of said portable table lamp prevents said battery from being exposed to excessive heat generated by the parts located inside the said envelope vase above said base.

16. A back-up power system according to claim 1 wherein a bracket is located inside said envelope vase to mount components including said DC to DC converter, said AC line ballast along with electronic components, and said bracket is mechanically attached to both said base of said portable table lamp and a bulb socket of said portable table lamp hiding said components from sight to allow said portable table lamp to have an appearance suitable for areas that desire a decorative setting.

17. A back-up power system according to claim 1 wherein said portable table lamp operates both when AC power is present and when AC power is not present and has a polarized line cord that fits into a standard house current receptacle.

18. A back-up power system according to claim 17 wherein the portable table lamp can be unplugged and transported to other areas either lighted or unlighted depending which position the said slide switch is in.

* * * * *